Sept. 22, 1931.     J. P. FISHER ET AL     1,824,713
APPARATUS FOR CLEANING GAS
Filed June 10, 1927
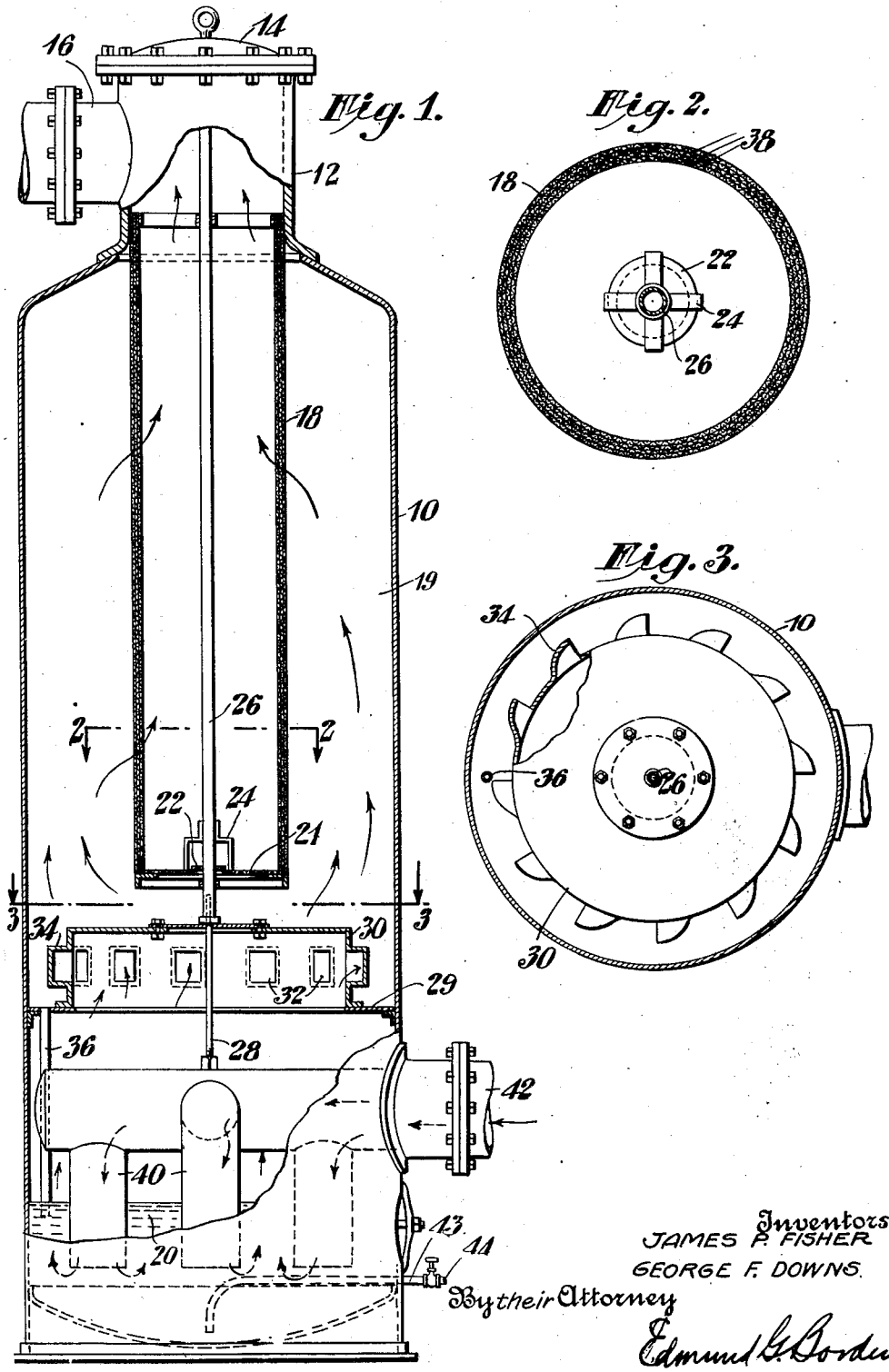
Inventors
JAMES P. FISHER
GEORGE F. DOWNS
By their Attorney
Edmund G. Gordon Patented Sept. 22, 1931

1,824,713

UNITED STATES PATENT OFFICE

JAMES P. FISHER AND GEORGE F. DOWNS, OF BARTLESVILLE, OKLAHOMA, ASSIGNORS TO EMPIRE OIL & REFINING COMPANY, OF DOVER, DELAWARE, A CORPORATION OF DELAWARE

APPARATUS FOR CLEANING GAS

Application filed June 10, 1927. Serial No. 197,791.

This invention relates to an improved apparatus for cleaning gas. One of the common methods or removing dust from gas is to pass the gas through a liquid such as mineral seal oil. While most of the dust is removed from the gas by such treatment, the scrubbed gas becomes laden with oil mist which on entering the gas lines with the gas causes a good deal of trouble by depositing throughout the lines and meters and valves and like equipment.

One of the main objects of this invention is to provide a means for effectually relieving mist-laden gas of its mist before it passes to the gas distributing lines or mains.

In accordance with this invention the mist-laden gas is introduced into an annular space between a tubular gas-permeable screen and a surrounding holder in such a manner that the gas is given a rotary motion about the screen whereby the heavier particles of mist are caused to impinge against and coalesce on the walls of the holder and the finer particles of mist are caused to coalesce on the walls of the screen as the gas passes therethrough on its way to the outlet from the holder.

The invention also includes a novel form of apparatus for cleaning dust and mist laden gas.

For a more complete understanding of the invention, references is made to the appended claims wherein the various features of novelty are set forth and to the detailed description thereof in connection with the accompanying drawings forming part of this specification.

Referring to the drawings wherein the preferred form of apparatus for practicing the invention is shown, Fig. 1 is a vertical section through the improved gas cleaning apparatus, some parts being in elevation;

Fig. 2 is a transverse cross-section on line 2—2 of Fig. 1 showing on an enlarged scale, the preferred structural features of the tubular screen which forms one of the important elements of the invention; and Fig. 3 is a vertical cross-section on line 3—3 of Fig. 1 with parts broken away, showing the preferred form of means for rotatably introducing the gas into that portion of the apparatus occupied by the tubular screen.

As already briefly indicated the dust laden gas is first scrubbed with a liquid, preferably oil, to remove as completely as possible the dust in suspension in the gas. For convenience of description the gas thus scrubbed will be termed wet or mist-laden gas because it carries mist from the scrubbing liquid in suspension. The apparatus for removing the mist from the wet or scrubbed gas will first be described.

In the preferred form of apparatus for practicing the invention there is provided a cylindrical tank or holder 10 having a relatively restricted neck 12 which is capped by a removable cover 14. Communicating with the neck is a conduit 16 through which the finally cleaned gas passes out of the apparatus to the distributing gas lines. Depending from the neck of the casing is a tubular gas-permeable screen 18 which is of considerably less external diameter than the internal diameter of the holder 10 whereby there is provided an annular space 19 between the screen and holder. The top of the screen is preferably open so as not to restrict the free flow of gas from the screen. As regards the lower end of the screen it is optional whether it be open or closed or if it be closed whether the closure be permeable or nonpermeable to gas for reasons which will more fully appear hereinafter.

The bottom of tank 10 is adapted to contain a body of liquid 20 through which the dust-laden gas is initially passed to relieve it of dust. The dust-laden gas is introduced into the liquid below the top level thereof by means of a plurality of downcomer pipes 40 which lead from a supply main 42. Extending across the casing below the screen is a device which serves, generally speaking, as a partition for dividing the casing into an upper separating chamber and a lower liquid container. As shown in the drawings this device comprises an inwardly extending flange 29 on which is supported a hood-like member 30 having a series of openings 32 extending through its side walls whereby the wet gas below the partition may pass therethrough and thereabove. These openings 32 communicate with suitable nozzles 34 annularly disposed around the hood 30 in such a manner that the gas passing therethrough enters the annular space 19 with a rotary movement around the screen whereby the heavier particles of mist are caused to impinge against and coalesce on the walls of the holder and from which they flow back to the main body of liquid as will be presently explained.

Referring now more particularly to the closure at the bottom of the screen 18, it has been demonstrated that when the apparatus is functioning properly there is no appreciable tendency for the gas to enter the screen from below, the tendency of the gas being rather to move away from that end of the screen and pass upwardly. It is, however, deemed preferable to provide a suitable closure in practical working apparatus. As shown, the closure preferably consists of a screen-disk 21 which is provided with a central opening which is normally kept closed by a plate-like valve 22. This valve is so arranged that it will move upwardly to uncover the opening to permit free passage of gas therethrough for direct passage to the outlet 16 at the top of the holder in case excessive pressure should develop within the holder from one cause or another. The valve 22 is preferably confined within a cage 24 secured to the framework of the screen. Passing through and secured to the cage is a rod 26 which extends axially through the screen. The lower end of the rod is centered on a suitable member 28 fixed in the axis of the casing in any suitable manner and thus serves to hold the screen properly positioned within the holder. By removing the cap 14 and pulling upwardly on the rod the screen may be withdrawn from the holder.

It is preferred to make the screen 18 of a plurality of layers 38 of screen in order to provide numerous wires to which the mist in the gas may cling as the gas passes through the walls of the screen. The mist after coalescing on the screen wires and on the walls of the holder flows down by gravity and finally reaches the partition flange 29 from whence it passes through pipes 36 into the main body of the liquid 21 below the normal liquid level thereof, it being understood that the pipes 36 extend below the normal liquid level in order to form a liquid seal against the upward passage of gas.

Dust and dirt which accumulate in the body of liquid or oil may be blown out of the tank through a blow-off pipe 43 by opening the valve 44 therein.

The operation of the above described apparatus will now be briefly set forth. The dust-laden gas is initially scrubbed by the liquid in the bottom of the tank and most of the dust thus removed. Due to the violent agitation of the liquid caused by introducing gas under pressure thereinto a spray or mist is formed which is taken up by the emerging gas. The wet or mist-laden gas in passing through the nozzles 34 in the partition is given a rotary motion about the screen with the result that the heavier droplets or particles of oil mist are caused to impinge against and coalesce on the walls of the holder down the sides of which they flow and finally pass to the liquid at the bottom of the tank by way of the drain pipes 36. The last traces of mist are removed from the gas as it passes through the walls of the screen on its way to the outlet 16. The finer droplets of mist in contacting with the wires of the screen cause the screen to become wet and due to surface tension phenomena the mist tends to adhere to the wires of the screen and flow downwardly by gravity rather than to remain in suspension in the gas during its passage through the screen. As the oil accumulates on the screen it flows downwardly toward the bottom of the screen as already stated and in so doing washes the screen free of any dust which may be deposited therein. The screen is therefore self-cleaning and is automatically maintained in operative condition at all times. The oil which flows down the screen finally reaches the bottom of the tank through the conduits 36 which as already stated, extend downwardly from the top of the partition flange 29. Notwithstanding the fact that the gas on entering the annular space 19 is given a rotary motion, it is found from practical experience that there is very little or no appreciable swirling of the gas within the screen. Consequently the gas flows quietly into the discharge main 16 at the top of the tank.

The apparatus above described is simple in construction and has been found to be admirably adapted for its intended purpose when operated in the manner specified. It will be readily appreciated that some changes in constructional features may be made without departing from the spirit of the invention.

What is claimed is:

1. Apparatus for removing mist from gas comprising, an upright cylindrical gas holder, a tubular gas-permeable screen depending from the top of said holder in spaced relation with respect to the sides thereof whereby there is formed an annular chamber between said screen and holder, a partition extending across the holder below the screen for dividing the holder into upper and lower compartments, a plurality of nozzles arranged in a circle associated with said partition and through which mist-laden gas from below the partition is passed into the upper of said compartments, said nozzles being so arranged as to introduce the mist-laden gas into the annular chamber in the upper compartment with a rotary motion about the screen whereby the heavier particles of mist are caused to impinge against the sides of the holder and coalesce thereon, a gas outlet communicating with the top of the screen which outlet the gas reaches by passing through the walls of the screen, the walls of the screen serving as a body to which the residual mist in the gas will cling and coalesce as the gas passes therethrough on its way to said outlet.

2. Apparatus for removing mist from gas comprising, an upright cylindrical gas holder, a tubular gas-permeable screen depending from the top of said holder in spaced relation with respect to the sides thereof whereby there is formed an annular chamber between said screen and holder, a partition extending across the holder below the screen for dividing the holder into upper and lower compartments, a plurality of nozzles arranged in a circle associated with said partition and through which mist-laden gas below the partition is passed into the upper of said compartments, said nozzles being so arranged as to introduce the mist-laden gas into the annular chamber in the upper compartment with a rotary motion about the screen whereby the heavier particles of mist are caused to impinge against the sides of the holder and coalesce thereon, a gas outlet communicating with the top of the screen which outlet the gas reaches by passing through the walls of the screen, the walls of the screen serving as a body to which the residual mist in the gas will cling and coalesce as the gas passes therethrough on its way to said outlet, the lower compartment of the holder adapted to contain a liquid through which dust-laden gas is initially passed before passing into said upper compartment as aforesaid.

3. Apparatus for removing mist from gas comprising, an upright cylindrical gas holder, a tubular gas-permeable screen depending from the top of said holder in spaced relation with respect to the sides thereof whereby there is formed an annular chamber between said screen and holder, a partition extending across the holder below the screen for dividing the holder into upper and lower compartments, a plurality of nozzles arranged in a circle associated with said partition and through which mist-laden gas below the partition is passed into the upper of said compartments, said nozzles being so arranged as to introduce the mist-laden gas into the annular chamber in the upper compartment with a rotary motion about the screen whereby the heavier particles of mist are caused to impinge against the sides of the holder and coalesce thereon, a gas outlet communicating with the top of the screen which outlet the gas reaches by passing through the walls of the screen, the walls of the screen serving as a body to which the residual mist in the gas will cling and coalesce as the gas passes therethrough on its way to said outlet, the lower compartment of the holder adapted to contain a liquid through which dust-laden gas is initially passed before passage into said upper compartment as aforesaid, and conduits extending downwardly from said partition through which liquid accumulating in the upper compartment may pass to a point below the liquid level in the bottom compartment.

4. Apparatus for removing mist from gas comprising, two telescoped tubular members in spaced relation to provide an annular chamber therebetween, the inner of said members being a gas-permeable screen and the outer one a gas holder, a plurality of nozzles arranged in a circle below said screen adapted to introduce mist-laden gas into said chamber with a rotary motion about the screen whereby the heavier particles of mist are caused to impinge against the sides of the holder and coalesce thereon, a gas outlet communicating with the top of the screen which outlet the gas reaches by passing through the walls of the screen, the walls of the screen serving as a body to which the residual mist in the gas will cling and coalesce as the gas passes therethrough on its way to said outlet, said nozzles forming part of a partition which divides the holder into upper and lower compartments the lower of which is adapted to contain a liquid through which dust-laden gas is initially passed, and means for introducing dust-laden gas into said liquid comprising a plurality of downwardly directed pipes connected with a source of gas supply.

5. In combination, an upright tubular gas holder, a gas-permeable screen depending from the top of said holder, the relative diameters of the holder and screen being such that an annular chamber is formed therebetween, an outlet from the holder in communication with the top of the screen, a plurality of nozzles arranged in a circle below the screen adapted to discharge mist laden gas into said chamber with a rotary motion around the screen, said nozzles forming part of a partition which divides the holder into upper and lower compartments, the lower of which is adapted to contain a liquid, a gas supply conduit extending into said lower compartment and having downwardly directed discharge pipes of a length to extend below the liquid level normally maintained therein, and a conduit through which liquid accumulating above said partition may pass into the liquid in the lower compartment.

6. In a gas cleaning apparatus, the combination of an upright gas holder, a tubular screen therewithin and extending lengthwise thereof in spaced relation thereto whereby there is formed a free gas space between the screen and holder, a gas outlet in communication with the top of the screen, said screen serving as a sieve through which gas present in said space must pass on its way to said outlet, a normally closed pressure-relief valve in said screen adapted to by-pass gas when under excessive pressure directly through said screen, and means for introducing gas into said free gas space.

7. In a gas cleaning apparatus, the combination of a cylindrical gas holder, a screen depending from the top of the holder in spaced relation therewith, a gas outlet in communication with the interior of said screen, a partition extending across said holder below the screen, a container for liquid below said partition, means for introducing gas below the surface of said liquid, and means associated with said partition for tangentially introducing into the space above the partition the gas which has passed through said liquid, said screen serving as a sieve through which the gas must pass on its way out of the holder.

8. In a gas cleaning apparatus the combination of a container for liquid, an upright cylindrical liquid and gas separating chamber, an outlet for gas from the top of the said chamber and a gas inlet ported out in the bottom of the chamber, means for introducing gas to be cleaned below the surface of liquid in said container, means associated with said gas inlet for tangentially introducing into said chamber the gas which has passed through the liquid in said container, and a conduit through which liquid accumulating in the bottom of the chamber may pass into the liquid in the container.

9. In a gas cleaning apparatus the combination of an upright cylindrical gas holder, a screen depending from the top of the holder in spaced relation with the walls thereof, a gas outlet in communication with the interior of said screen, a partition extending across said holder below the screen, means associated with said partition for rotatably admitting gas into the casing between the walls thereof and the screen, said screen serving as a sieve to separate liquid and solid extraneous matter from the gas to be cleaned as the gas normally passes therethrough on its way out of the casing, and a conduit through which liquid accumulating in the bottom of the holder may be discharged.

10. An apparatus for cleaning gas comprising a cylindrical casing, a cylindrical screen mounted in said casing in spaced relation to the cylindrical wall thereof, said screen having a mesh sufficiently fine to separate liquid and solid extraneous matter from the gas to be cleaned, means for introducing gas to be cleaned into one end of said casing and on the outside of said screen, said means comprising a circular arrangement of spaced nozzles adapted to direct the gas around said screen and against the inner side of said casing, a gas outlet at the other end of said casing adapted to discharge gas from the inside of said cylindrical screen, and a conduit through which liquid accumulating in the bottom of said cylindrical casing may be discharged.

11. In gas cleaning apparatus, a combination in compact arrangement of a container for liquid and an upright liquid and gas separating chamber, said chamber being mounted at a higher level than said container, an outlet for clean gas from the top of said chamber, means for introducing gas to be cleaned in intimate contact with the liquid in said container, a gas inlet opening centrally into the bottom of said chamber having means associated therewith for tangentially introducing into the chamber gas which has passed through said container whereby liquid particles carried in suspension in the gas are thrown outwardly against the chamber walls, and a conduit through which liquid accumulating in said chamber may flow by gravity back into the container.

In testimony whereof we have hereunto affixed our signatures.

JAMES P. FISHER.
GEORGE F. DOWNS.